United States Patent [19]

Blach

[11] Patent Number: 4,702,695
[45] Date of Patent: Oct. 27, 1987

[54] HOUSING SECTION FOR A TWIN SCREW SHAFT MACHINE

[76] Inventor: Josef A. Blach, Wilhelmstrasse 24, 7144 Asperg, Fed. Rep. of Germany

[21] Appl. No.: 925,504

[22] Filed: Oct. 30, 1986

Related U.S. Application Data

[63] Continuation of Ser. No. 686,318, Dec. 26, 1984, abandoned.

[30] Foreign Application Priority Data

Dec. 30, 1983 [DE] Fed. Rep. of Germany ....... 3347537

[51] Int. Cl.$^4$ .......................... F27D 3/08; F01C 21/10
[52] U.S. Cl. .................................... 432/154; 219/390; 366/83; 418/201
[58] Field of Search ........................... 432/154; 34/179; 219/422, 390; 165/87; 366/24, 83; 418/201

[56] References Cited

U.S. PATENT DOCUMENTS

| | | | |
|---|---|---|---|
| 2,943,845 | 7/1960 | Jakitsch | ................................. 165/87 |
| 3,010,151 | 11/1961 | Dickinson et al. | . |
| 3,268,949 | 8/1966 | Schmidt et al. | . |
| 3,779,522 | 12/1973 | Loomans | ................................. 366/83 |
| 3,971,875 | 7/1976 | Regalbuto | ........................... 219/390 |
| 4,385,876 | 5/1983 | Scherping et al. | . |

FOREIGN PATENT DOCUMENTS

| | | |
|---|---|---|
| 1729345 | 6/1971 | Fed. Rep. of Germany . |
| 2256671 | 5/1973 | Fed. Rep. of Germany . |
| 2423785 | 9/1975 | Fed. Rep. of Germany . |
| 2659037 | 6/1978 | Fed. Rep. of Germany . |
| 2756752 | 6/1979 | Fed. Rep. of Germany . |
| 8005312 | 6/1980 | Fed. Rep. of Germany . |
| 3023393 | 1/1982 | Fed. Rep. of Germany . |

*Primary Examiner*—Henry C. Yuen
*Attorney, Agent, or Firm*—Neuman, Williams, Anderson & Olson

[57] ABSTRACT

A housing section for a twin screw shaft machine which has a load-bearing outer housing with a substantially rectangular outer cross section, an inner housing designed as an abrasion insert and a heating device encompassing the outer housing. The outer cross section of the inner housing and the inner cross section of the outer housing are substantially rectangular and the heating device and the outer housing are divided approximately diagonally in the longitudinal direction. The individual parts are therefore easy to manufacture and may be tightened against one another in even overall engagement.

4 Claims, 3 Drawing Figures

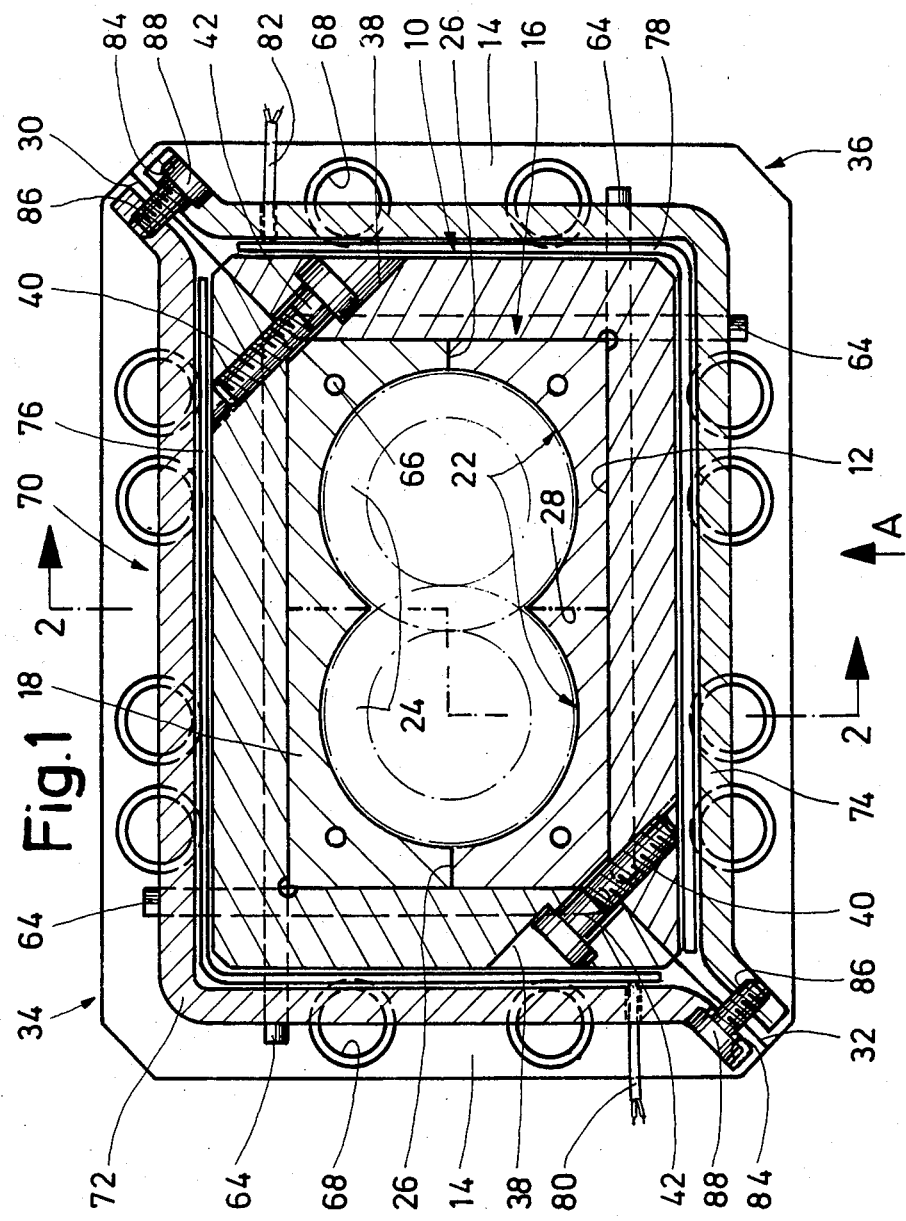

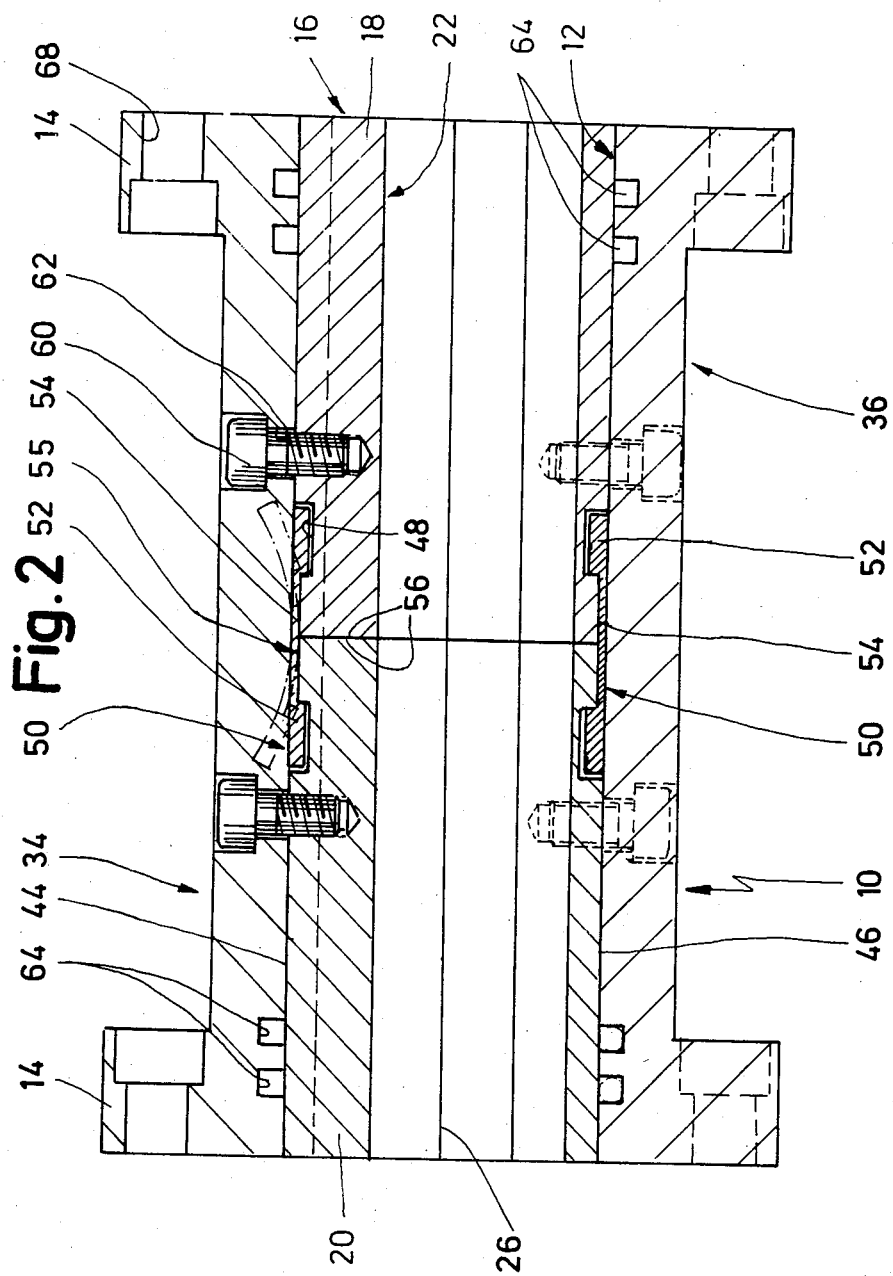

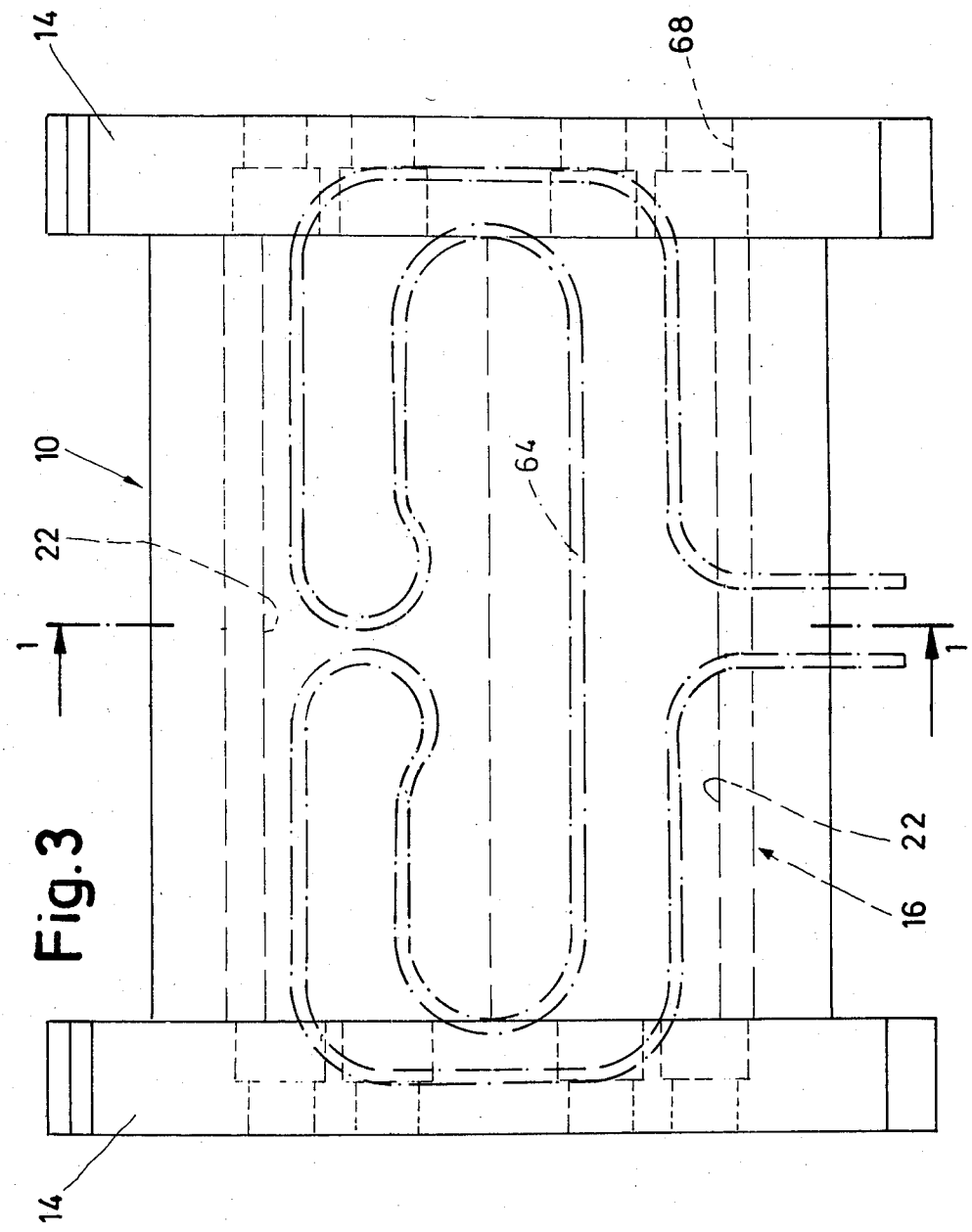

HOUSING SECTION FOR A TWIN SCREW SHAFT MACHINE

This application is a continuation of application Ser. No. 686,318, filed 12/26/84 now abandoned.

The housing of an extruder or any other machine having a plurality of interacting screw shafts is subjected to exceedingly varied stresses of a mechanical and chemical nature in its regions lying behind one another in the longitudinal direction of the shafts, for example when glass fibers are mixed into a plastics material already melted in the machine. In this case, the mechanical wear and tear on the housing cavity accommodating the screw shafts suddenly increases at the place where the glass fibers are added. In order to take into account the varying stresses and wear and tear, to which the machine housing is subjected along the screw shafts, it is customary to divide the machine housing transversely to the longitudinal direction, i.e. the housing comprises a plurality of housing sections having a load-bearing outer housing divided in the longitudinal direction as well as an inner housing designed as an abrasion insert and accommodating the screw shaft.

As shown, for example, in FIG. 7 of German patent specification No. 2,423,785, the aim is to design the inner housing produced from relatively expensive materials such that its walls are as thin as possible and to transfer to the outer housing the task of ensuring, at least substantially, the mechanical stability of the machine housing. In this known construction, the outer cross section of the inner housing and the inner cross section of the outer housing are oval and the outer housing is divided in the longitudinal direction, namely horizontally through the middle. The upper and lower portions of the outer housing are pressed against each other and against the inner housing by means of anchoring bolts. Another aim is for the outer housing to be tightened overall as uniformly as possible against the inner housing when the outer housing portions are drawn together and towards the inner housing, not only due to the necessary mechanical support to be given to the inner housing by the outer housing but also due to the necessity of ensuring a good transfer of heat from the inner to the outer housing or vice versa; heating or cooling elements for regulating the temperature of the material to be worked by the screw shafts are located in the outer housing. A good uniform tightening of the outer housing against the inner housing cannot, however, be achieved when the outer housing is divided horizontally and the inner housing has an oval outer cross section, quite apart from the fact that it is difficult to work oval cross sections to the required degree of accuracy. In one embodiment, according to FIG. 1 of German patent specification No. 2,423,785, the horizontally divided outer housing is, in fact, pressed evenly overall against the inner housing as the outer cross section of the inner housing is defined by arcs. However, this outer cross section of the inner housing causes the inner housing to have walls of greatly varying thickness so that the temperature drop towards the wall of the housing cavity is correspondingly unequal and a great deal of machining work is necessary on the inner housing. This is particularly disadvantageous in view of the expensive and often poorly workable materials used for this structural part.

The same applies for another known construction (German Offenlegungsschrift No. 30 23 393) having a circular-cylindrical outer housing, into which an inner housing is inserted. This inner housing is designed as an abrasion insert and has convex side faces designed along the lines of a circular cylinder.

The object underlying the invention was to design a housing section for a twin screw shaft machine comprising a load-bearing outer housing divided in the longitudinal direction and having a substantially rectangular outer cross section, the outer housing enclosing an inner housing in closely fitting relationship and being adapted to be tightened against the inner housing by means of tightening screws penetrating the interface, the inner housing being designed as an abrasion insert and having two overlapping longitudinal bores parallel to one another, so as to result in an optimum compromise between the following requirements: The mass of the abrasion insert is to be as low as possible with a view to the expensive materials required therefor, it should be easy to produce the outer cross section of the abrasion unit or the inner cross section of the outer housing on simple machines but still with a high degree of accuracy and it is necessary to have a good even contact pressure between the inner and outer housings once the outer housing portions have been tightened against one another and against the inner housing. This object may be accomplished in accordance with the invention in that the outer cross section of the inner housing and the inner cross section of the outer housing are substantially rectangular, that the outer housing is divided along two diagonally opposed longitudinal edges of the inner housing and that a heating device is provided which encompasses the outer housing and is divided along two diagonally opposed longitudinal edges of the outer housing.

From the above discussion it is to be understood that the housing section means a longitudinal section of the machine housing, the interfaces of the outer housing and the heating device extend in the longitudinal direction of the housing and the inner housing is encompassed by the outer housing and the latter by the heating device only around the circumference and not at the ends.

Inner housings made of particularly wear-resistant materials can either not be machined at all along their longitudinal bores or only over short lengths (e.g. by wire erosion). Materials of this type cannot, therefore, be used for relatively long housing sections. The same applies for final machining of the inner housing after hardening. The abrasion inserts also tend to become distorted during hardening and/or application of a layer, which is to be as wear-resistant as possible, by deposition welding on the longitudinal bore faces. For this reason, a preferred embodiment of the inventive housing section has an inner housing which is divided at least once more transversely to the longitudinal direction, i.e. the outer housing of a housing section accommodates a plurality of inner housings lying one behind the other, and adjacent end faces of the inner housing portions are pressed together in that recesses are provided in at least two opposite outer faces of the inner housing portions, adjacent the end faces, and these recesses receive the ends of flat clips bridging the interface, the ends of these clips springing out of the recesses when the outer housing is removed and being pressed into the recesses when the outer housing portions are tightened against the inner housing such that the clips form longitudinal tension elements. The recesses in the inner housing portions and the ends of the clips are therefore designed and adapted to fit one another such that pressing the clip ends into the recesses when the outer housing portions are tightened against the inner housing results in tensional forces which are directed in the longitudinal direction of the housing and press the inner end faces of the inner housing portions against each other. Means of this type for pressing the inner housing portions against one another are, of course, much cheaper than, for example, flanges on the end faces of the inner housing portions. Relatively short inner housing portions can therefore be produced without any appreciable increase in costs. These inner housing portions are cheaper to manufacture than longer abrasion units and have less tendency to become distorted. In addition, this type of clip is not a hindrance to assembly of the outer heating device whereas housing sections with flanges cannot be heated by external heating means in the region of such flanges. At this point, it is to be noted that the abrasion inserts or inner housings are usually produced from full-hardening steels, such as for example chromium steel. It is also obvious that clip connections of this type can only be used for inner housings having a rectangular cross section and not for abrasion inserts having a round or oval cross section.

With the inventive construction, it is recommended that the inner housing be provided in the region of its corners with longitudinal bores for receiving set pins. This does not, however, cause any increase in expense or resources in view of the exact fit between the outer housing and the inner housing since it is then not necessary to use set pins between the sections of the outer housing.

A reduction in production costs is also brought about when grooves are worked into the inner faces of the outer housing to form channels for temperature regulation (in particular cooling) of the inner housing. Since the outer housing is preferably designed as a cast part these grooves can be cast directly into the outer housing. In this way, the channels serving as means to regulate the temperature of the inner housing are positioned as close as possible to the inner housing. This results in a good transfer of heat and the inner housing can also be cooled, in the area of the flanges, better than in constructions where a temperature regulating means is positioned only between the flanges of the outer housing and encircles these flanges. It is, indeed, already known to work bores for heating or cooling the inner housing into the outer housing adjacent the abrasion insert. These bores are, however, more complicated and expensive to produce than grooves. In addition, the space between these bores and the inner housing is always greater than that between the inner housing and the channels formed by the grooves in the preferred embodiment of the inventive construction.

Additional features, advantages and details of the invention are given in the attached claims and/or the following description as well as the attached drawings of a preferred embodiment of an inventive housing section.

In the drawings,

FIG. 1 shows a section through the housing section perpendicular to the longitudinal direction of the machine housing;

FIG. 2 is a longitudinal section through the housing section along line 2—2 in FIG. 1 but without any heating device and FIG. 3 is a somewhat simplified view of the housing section, again without the heating device, seen in the direction of arrow A in FIG. 1, the latter representing a cross section along line 1—1 in FIG. 3.

FIGS. 1 and 2 show an outer housing 10 of the housing section which has a longitudinal through opening 12 rectangular in cross section and a flange 14 at each end, via which the illustrated housing section is secured to an adjacent housing section in the longitudinal direction. An inner housing designated as a whole as 16 is inserted into the longitudinal opening 12. The inner housing consists of two portions 18 and 20 lying one behind the other and has two laterally overlapping longitudinal bores 22 for receiving two intermeshing screw shafts 24 illustrated in FIG. 1 by dash-dot lines.

In accordance with the invention, the inner housing portions 18, 20 may be divided horizontally in the longitudinal direction along an interface 26. In addition, it may be advantageous with respect to machining of the inner housing portions to provide welding seams 28 either instead of interface 26 or in addition thereto.

As shown in FIG. 1, the outer housing 10 is also divided in the longitudinal direction along interfaces 30 and 32 which extend approximately diagonally in relation to the cross sections of the outer housing 10 and the inner housing 16. The resulting outer housing portions 34 and 36 therefore have an angular cross section, in accordance with the invention. Each outer housing portion has stepped bores 38 and threaded bores 40 for receiving tightening screws 42 for tightening the outer housing portions against one another and against the inner housing. In accordance with the invention the outer housing portions 34, 36 have angularly extending inner faces and the interfaces 30, 32 extend approximately diagonally, i.e. not parallel to one of the side faces of the inner housing. For this reason, a good overall engagement is achieved between the outer housing portions and the inner housing due to the tightening screws 42 which are also inclined at an angle.

The inner housing portions 18, 20 have transversely extending grooves 48 on two opposite side faces 44, 46 in at least the region of their facing ends. Clips 50 engage in these grooves with their ends formed by transversely extending ribs 52 when the outer housing portions 34, 36 are tightened against one another. The ribs 52 are connected by a crosspiece 54, which is designed like a leaf spring. This crosspiece has the shape illustrated in FIG. 2 by dash-dot lines when the clip is disengaged and is received by recesses 55 in the inner housing portions 18, 20 when the housing is assembled. Furthermore, the ribs 52 and grooves 48 are adapted to each other in their shape and spacing such that the end faces 56 of the inner housing portions 18, 20 are pressed together by longitudinally acting forces when the ribs 52 are pressed into the grooves 48 during tightening of the outer housing portions 34, 36. For this purpose, it would be conceivable, for example, to provide the ribs with inclined faces on their facing longitudinal edges.

Finally, the inner housing portions 18, 20 are secured in axial direction in the outer housing portions 34, 36 by screws 60 which are seated in bores 62 of the outer housing portions so as to have a certain clearance.

As shown in FIGS. 1 and 2, grooves 64 for heating and/or cooling elements are cast into the faces of the longitudinal opening 12 of the outer housing 10. As shown in FIG. 3, these grooves form an almost completely closed rectangle which still leaves space for the clips 50 and extends right under the flanges 14.

Finally, the inner housing 16 has bores 66 for receiving set pins and the flanges 14 of the outer housing have bores 68 which receive screws for axially fastening the housing sections together.

In accordance with the invention, the minimum wall thickness of the inner housing 16 is approximately equal on both its broad and narrow sides.

A heating device 70, which is divided approximately diagonally in the same way as the outer housing 10, consists of two cover portions 72 and 74 of angular cross section as well as electric plate heating elements 76, 78, the connection wires of which have been designated 80 and 82. Each cover portion has stepped bores 84 and threaded bores 86 for receiving tightening screws 88 which serve to tighten the cover portions against one another and against the outer housing 10 or rather the plate heating elements 76, 78.

What is claimed is:

1. A housing module for a twin screw shaft machine comprising an inner housing in the form of an abrasion insert and having two overlapping longitudinal bores defining a longitudinal direction and being parallel to one another; a hollow load-bearing outer housing having an interior surface of substantially rectangular cross-section surrounding exterior surface portions of said inner housing; said exterior surface portions defining a substantially rectangular outer cross-section of said inner housing; said interior and exterior surfaces engaging in closely fitting relationship; said outer housing being divided into first and second longitudinal housing sections along interfaces extending substantially parallel to said longitudinal direction and along two diagonally opposed longitudinal edges of said inner housing; clamping means for providing clamping forces tightening said first and second longitudinal housing sections of said outer housing together and against said inner housing; said clamping forces being oriented substantially transversely to said longitudinal direction and obliquely to all of said exterior surface portions of the inner housing, and a heating jacket divided into longitudinal housing sections along interfaces extending substantially parallel to the longitudinal direction, said heating jacket surrounding the outer housing.

2. A housing module in accordance with claim 1, wherein the inner housing is formed in at least two longitudinal sections arranged in end-to-end engagement; opposite surface portions of each of said housing sections adjacent said end-to-end engagement being recessed; flat spring clips bridging surface recesses of said housing sections disposed on opposite sides of said end-to-end engagement; said spring clips having end portions biased inwardly into said recesses by said first and second sections of said outer housing whereby said inner housing sections are clamped together in said end-to-end engagement.

3. A housing module in accordance with claim 1, wherein the inner surface of the outer housing is provided with groove-like channels for receiving a temperature-controlling fluid whereby the temperature of the inner housing may be regulated.

4. A housing module in accordance with claim 1, wherein said heating jacket is divided along two diagonally opposed longitudinal edges of the outer housing.

* * * * *